June 4, 1935.  E. FISCHEL ET AL  2,003,929
FLUID COMPASS
Filed Sept. 7, 1933
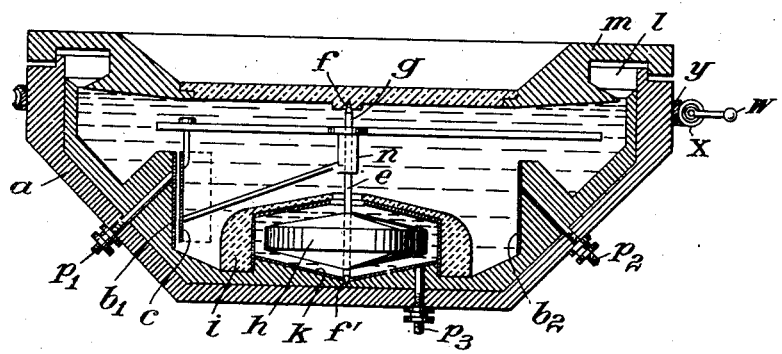
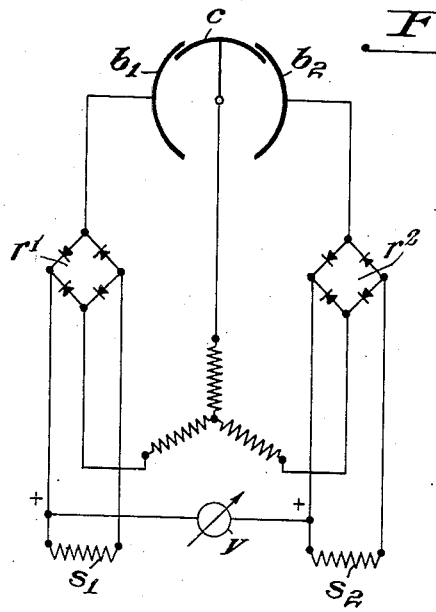
INVENTORS
EDUARD FISCHEL
GERHARD RIEPER
BY
ATTORNEYS.

Patented June 4, 1935

2,003,929

UNITED STATES PATENT OFFICE 2,003,929

FLUID COMPASS

Eduard Fischel, Berlin-Charlottenburg, and Gerhard Rieper, Berlin-Mariendorf, Germany, assignors to Siemens & Halske, Aktiengesellschaft, Siemensstadt, near Berlin, Germany, a corporation of Germany Application September 7, 1933, Serial No. 688,537
In Germany September 24, 1932

5 Claims. (Cl. 33—204)

This invention relates to fluid compasses.

In the case of magnet compasses fitted within an electrolyte and making indications under the action of current changes between electrodes solid with the magnet system and counter electrodes secured to the compass casing, the bearing of the magnet system and the flow of current through the electrolyte are of vital importance for ensuring a sensitive and exact indication. The magnet system is usually suspended in points, whereby, for easing this bearing, it has already been suggested to equip the magnet system with floating bodies. The point suspension has the drawback that the magnet system is liable to swing and thus to vary the path of current through the electrolyte and, thereby the currents serving for indication purposes, not only by the horizontal rotation but also, in an objectionable manner, by its swinging movements.

In the case of a magnet compass, the method is furthermore known, of placing the magnet system within a casing filled with an electrolyte, so as to enable a compass provided at the lower end of the magnet system to rest on a stone, after the manner of a point suspension. Since at the top provision has only been made for a support, the known device enables the rotating shaft of the magnet system, which has simultaneously rigidly mounted thereon one or several electrodes, to depart within certain limits from the desired vertical position.

According to the invention these drawbacks are eliminated by the fact that the magnet system is carried by a vertical shaft pivoted at both ends and having mounted upon it a floating body for easing the bearings. This floating body can simultaneously also be used for supplying the electrodes solid with the magnet system with current, since the lower surface is positioned opposite to the current supply electrode solid with the compass casing.

In order to avoid that the current passes from the floating body directly to the electrodes through the electrolyte, the floating body should at its upper part be covered with an insulating cap. This cap may be equipped at its lower part facing the floating body with a current-carrying layer which is conductively connected to the current supply sheet so as to enable the current to pass over to the floating body casing from all sides.

In order to adapt such a device for the different purposes, more particularly for automatic control and conveyance of the compass needle position, the three electrodes should be connected to the three phases of a triphase current in such a manner that, in the mid-position of the electrodes solid with the magnet system, the currents flowing between this electrode and the counter electrodes are equal in magnitude, whereas one current or the other preponderates, if the magnet system rotates with respect to the compass casing, the difference between the two currents being responsive for the compass needle position or serving for control purposes.

The drawing shows a constructional example of the invention. Fig. 1 is a section through the compass casing and Fig. 2 a circuit diagram of the electrodes of the compass shown in Fig. 1.

According to Fig. 1, the compass casing $a$ contains two electrodes $b_1$ and $b_2$ which are insulated from one another and from the casing, connected to terminals $p_1$ and $p_2$ and staggered through an angle of 180°. Between these electrodes, there is placed a third electrode $c$, solid with the magnet system $g$ and consisting, for instance, of two magnet needles. It is capable of turning with the magnet system about its shaft. The shaft $e$ is suspended in points at bearings $f$ and $f'$. The magnet system is eccentrically secured to the holder $n$, so that the weight of the electrode $c$ is exactly balanced. The shaft $e$ carries, in addition, the floating body $h$, serving for easing the bearing of the magnet system and, simultaneously, for supplying the electrode $c$ with current. In order to avoid the direct passage of the current from the floating body $h$ to the electrodes $c$, $b_1$ and $b_2$, the floating body is covered with a cap $i$ of insulating material. The inner surface of this cap is coated with electrode sheet and conductively connected to the electrode sheet $k$ secured to the casing and supplied with current from the terminal $p_3$. The leakage of current occurs thus as well at the lower end as at the upper end of the floating body. At the top of the compass casing, the cover forms an air-space $l$, connected to the electrolyte chamber only by means of a very narrow circular aperture, in order to avoid fluctuations in fluid. In this chamber, the separated gases can be accumulated and, in addition, the electrolyte is capable of expanding within it, under the action of fluctuations in temperature. The electrodes $b_1$ and $b_2$ may be used, in a manner well-known in the art, to adjust a device indicating the compass needle position or to adjust rotary magnets effecting, in their turn, the adjustment of control surfaces in the case of ships or aeroplanes.

A device utilizable for this purpose has been represented in Fig. 2. In the mid-position of the electrode $c$ solid with the magnet system, the currents flowing between it and the counter electrodes $b_1$ and $b_2$ are equal in magnitude. A relative rotation of the electrodes results in a variation of the two currents intensities in such a manner that, according to the direction of rotation, for example, the intensity of the current flowing between the electrodes $c$ and $b_2$ decreases. This holds if, from the drawn position, the electrode $c$ rotates in the counter-clockwise direction. Use can be made of the difference between the two current components to operate a device indicating the compass needle position or to adjust rotary magnets which, through intermediate members, effect the adjustment of the control surfaces of the ship or aeroplane upon which the fluid compass is mounted.

Though the indication of the rotary magnets or their adjustment might be effected directly by the alternating currents emanating from the electrodes $b_1$ and $b_2$, it is, according to the constructional example under consideration, preferable to insert respectively rectifiers $r^1$ and $r^2$ in the two circuits, the two coils $s_1$ and $s_2$ of the two rotary magnets being connected to the two rectifiers. The latter may be of any suitable form and preferably are dry rectifiers such as shown for example in United States Patents #1,640,335 and #1,844,928. Between the two positive poles of the D. C. circuit, there is, in addition, inserted a voltmeter $v$ whose zero point lies in the center. The voltmeter $v$ may be of any conventional type suitable for the purpose and may for example be constructed as illustrated in Fig. 175, page 195 of the book by Graetz entitled "Die Elektrizetät und ihre Anwendungen", 21st edition, 1922, published by J. Engelhorns, Stuttgart, Germany, and described in the text associated with said figure. This voltmeter indicates the zero position of the electrodes $b_1$, $b_2$, $c$ shown in the drawing, as well as any departure whatever from this position relative to magnitude and direction, irrespective of whether such a departure is due to an undesirable rotation of the vessel or to the fact that the captain brings about a required change of course, in a manner well-known in the art, by adjusting the counter electrodes $b_1$ and $b_2$ or the whole fluid compass. Such a required rotation of the casing containing the fluid compass and therewith the counter electrodes $b_1$ and $b_2$ solid with it, must necessarily be assumed, if use is to be made in the manner described above of the device for automatically adjusting the control surfaces with the aid of rotary magnets. The rotary magnets then adjust the control surfaces of the device under consideration until, through the rotation of the whole vessel, the zero position of the electrode has again been reached. The voltmeter $v$ again indicates the zero value, as soon as the zero position has been reached, whereas the captain is able to read off the desired course. A desired rotation at a determined angle may be executed, for instance, by means of a crank $w$ which drives a worm $x$ meshing with a worm gear $g$. The worm gear is attached to the outer surface of the casing $a$ of the compass. In air craft the crank may be placed at the pilot's seat.

The performance of the whole circuit diagram is, of course, the same if, instead of three-phase alternating current, use is made of one-phase or two-phase current. The electrodes have been dimensioned and shaped in such a manner that a great deflection of the magnet system is in accordance with a strong current and a small deflection with a weak current.

For a reliable working of the described device, the shape of the electrodes is of vital importance. Up to the present, use has been made for the electrodes of fluid compasses of either a metal or a graphite as constructional material. However, the surrounding fluid attacks the metal and, on the passage of the electric current, metal particles are dissolved and vary the original composition of the electrolyte. For this field of application, graphite electrodes have the drawback of insufficient chemical strength and, in addition, limits are imposed on them with respect to shaping. These drawbacks can be avoided according to the invention by constructing the electrodes of a mixture of graphite and at least one artificial resin formed by condensation, such as bakelite and resinite. Such an electrode can, on the one hand, be given any shape whatever and is, on the other hand, to a large extent acid- and alkaline-proof in all the cases occurring in actual practice, even in those where the temperature of the liquid surrounding them is above room temperature.

The artificial resins which may be taken into account as components of the mixture, more particularly bakelite and resinite are, as is well-known, constituted by condensation of formaldehyde or ammonium with phenol or cresol. For producing the new fluid electrode, it is possible to intermix, for instance, dry bakelite powder and dry graphite powder in a finely ground condition and to press the powder mixture into the desired electrode shape at a heating temperature of about 180° C. In the aforesaid powder mixture, the proportions of graphite and bakelite may suitably be so calculated, that for each one hundred parts by weight of graphite there will be about 25–40 parts by weight of bakelite.

Instead of this, use can also be made of a mixture of graphite with bakelite varnish (in case of need, mixed with solvents) which is formed after partial desiccation of the bakelite. By subsequent compression at room temperature or increased temperature, a mechanically solid body can again be obtained, which is adapted for use as fluid electrode. On using cold compression, it is in most cases recommendable to effect a subsequent heating. According to the application of the electrode, the ratio of the components of the mixture will be chosen different. If a higher conductivity is required for the electrode, use should be made of a correspondingly greater amount of graphite, whereas otherwise a relatively greater amount of artificial resin must be employed for producing the mixture. In order to provide for a convenient current supply and, in the case of need, also for a reliable support for the electrode, the powder mixture under consideration can be pressed around a metallic core, say a copper bar.

What we claim is:

1. In a fluid compass for use in air or water craft the combination of at least one counter-electrode at the inner surface of the compass casing, a vertical axle pivoted at both ends in bearings and adapted to carry for co-action with said counter-electrode at least one electrode and the magnet system, a metallic float member secured to the lower end of said axle and being electrically connected to said electrode, a casing substantially enclosing said member, said casing being made of insulating material and provided with an opening for the axle, a metallic layer on the inside of said casing, an additional electrode placed inside of the casing adjacent to said floating member and being electrically connected to said layer, and circuit connections between said additional electrode and said counter-electrode for operating an indicating or a steering device.

2. In a fluid compass for use in air or water craft, the combination of a casing containing an electrically conductive liquid, at least one counter-electrode arranged upon the inner surface of the casing and immersed in said liquid, a vertical axle for the magnet system pivoted at both ends in bearings within said casing, at least one additional electrode secured upon the axle and immersed in said liquid for co-operation with said counter-electrode, a float immersed in said liquid and secured upon said axle, two electro-magnetic coils for throwing the rudder of the craft in opposite directions, electrical connections between the counter-electrode, the additional electrode and the two electro-magnetic coils, and an electrical indicating instrument with deflections in opposite directions connected with both of the electro-magnetic coils and adapted to indicate the differences between the currents in the two electro-magnetic coils.

3. A fluid compass for use in air or water craft as set forth in claim 2, in which two counter-electrodes are arranged upon the inner surface of the casing in spaced relation to each other and immersed in the electrically conductive liquid, and the additional electrode secured upon the vertical axle and immersed in said liquid is adjustable in parallel relation to the two counter-electrodes.

4. In a fluid compass for use in air or water craft as set forth in claim 2, adjusting means for rotating the counter-electrode and the casing containing the electrically conductive liquid, an alternating current source and a rectifier arrangement which are connected between the counter-electrode and the additional electrode on the one side and between the electro-magnetic coils and the electrical indicating instrument on the other side.

5. In a fluid compass for use in air or water craft as set forth in claim 2, in which the counter-electrode and the additional electrode are constructed of a mixture of graphite and artificial resin, particularly bakelite.

EDUARD FISCHEL.
GERHARD RIEPER.